C. P. CLARKE.
AIR PUMP.
APPLICATION FILED FEB. 29, 1912.
1,070,585.
Patented Aug. 19, 1913.
2 SHEETS—SHEET 1.
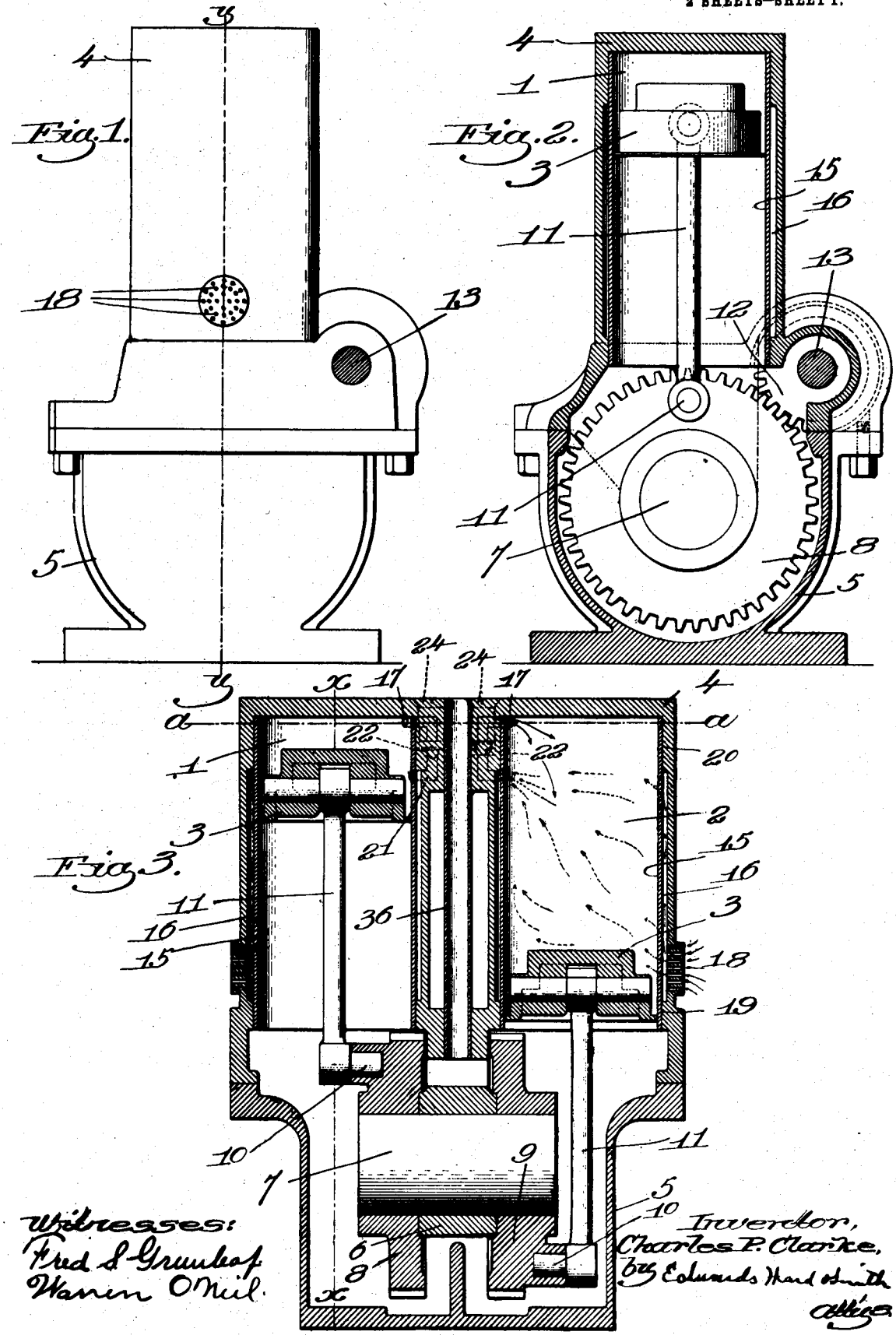

C. P. CLARKE.
AIR PUMP.
APPLICATION FILED FEB. 29, 1912.
1,070,585.
Patented Aug. 19, 1913.
2 SHEETS—SHEET 2.
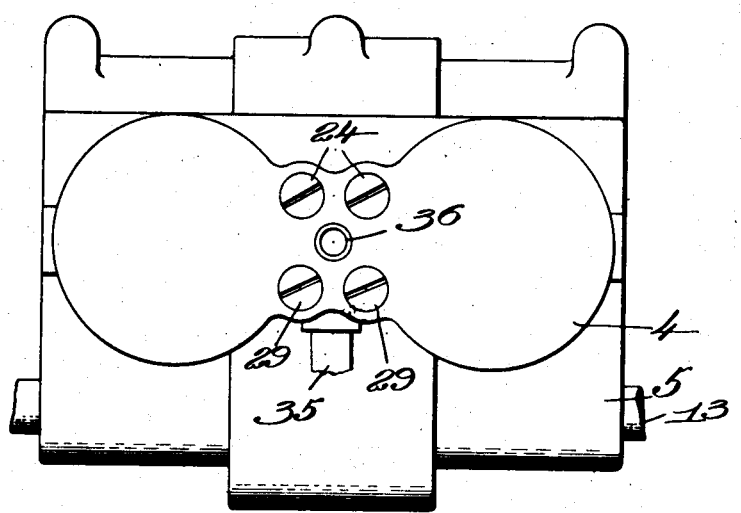
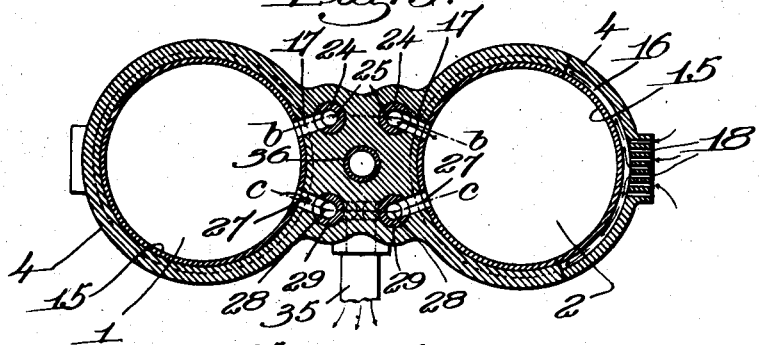
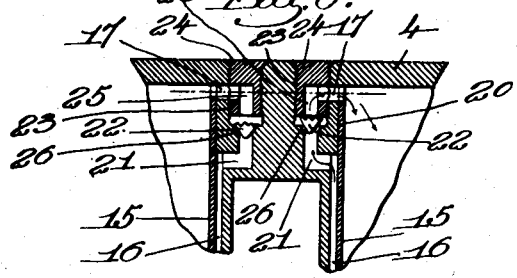
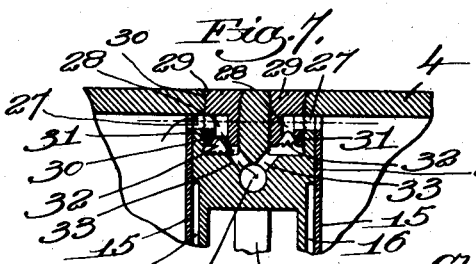
Witnesses:
Fred. S. Greenleaf
Warren O'Neil
Inventor,
Charles P. Clarke,
by Edmonds Hand & Smith
Attys.

UNITED STATES PATENT OFFICE.

CHARLES P. CLARKE, OF BOSTON, MASSACHUSETTS.

AIR-PUMP.

1,070,585.  Specification of Letters Patent.  Patented Aug. 19, 1913.

Application filed February 29, 1912. Serial No. 680,681.

*To all whom it may concern:*

Be it known that I, CHARLES P. CLARKE, a citizen of the United States, residing at Boston, county of Suffolk, State of Massachusetts, have invented an Improvement in Air-Pumps, of which the following description, in connection with the accompanying drawing, is a specification, like characters on the drawing representing like parts.

This invention relates to an air pump and is especially designed for use in connection with automobiles for pumping up the tires thereof, and one of the objects of the invention is to provide a novel construction whereby the current of cool air entering the pump cylinder may be used for keeping the cylinder cool and offsetting the effects of the heat of compression.

Other objects of my invention are to improve generally pumps of this type, all as will be more fully hereinafter described and then pointed out in the appended claim.

Referring to the drawings wherein is illustrated a selected embodiment of my invention which has been chosen for the purpose of describing the principles thereof, Figure 1 is a side view of a pump embodying the invention; Fig. 2 is a vertical section on substantially the line x—x, Fig. 3; Fig. 3 is a section on the line y—y, Fig. 1; Fig. 4 is a top plan view; Fig. 5 is a section on the line a—a, Fig. 3; Fig. 6 is a section on the line b—b, Fig. 5; Fig. 7 is a section on the line c—c, Fig. 5.

As stated above, the pump herein shown is especially designed in connection with automobiles for pumping up the tires thereof, although the principal features of the invention might be employed in other pumps, and I do not wish my invention to be limited in its use to air pumps for automobile tires. The pump may have one, two or any number of cylinders desired. In the selected embodiment of the invention herein shown, the pump is formed with the two cylinders 1 and 2 in each of which operates a suitable piston 3. These two cylinders are shown as formed in a single casting 4 which is secured to a base piece 5 that contains the crank shaft, said base piece being secured to some suitable part of the automobile by any appropriate means. The base piece is provided with a bearing 6 in which rotates a shaft 7, and said shaft has fast thereon two gear wheels 8 and 9, respectively, each gear wheel having a crank pin 10 extending therefrom which is connected to a connecting rod 11 of one of the pistons. The crank pins 10 are oppositely disposed, so that the pistons will move in opposite directions. The gears 8 and 9 mesh with pinions 12 fast on a driving shaft 13 which extends through bearings formed in the casting 4 and is driven from the automobile engine or any other source of power. In pumps of this nature the heat of compression is a considerable factor and sometimes is so great as to interfere with the proper operation of the pump. My invention relates to a means for counteracting this heat of compression by means of the cool air which is delivered to the cylinders. In accordance with my invention I provide each cylinder with an air chamber surrounding the inner walls and which communicates with the inlet port and through which the incoming air is delivered.

In the drawings each cylinder is formed with an inner wall 15 in which the piston 3 works and is provided with an annular chamber 16 exterior to said wall, which chamber communicates with the inlet port 17 leading to the cylinder at the top and on one side thereof and also communicates with the atmosphere through an inlet opening 18 at the bottom on the opposite side of the cylinder; this arrangement of the ports 17 and 18 insuring a rush of air due to the suction in the operation of the piston and causing the air to completely encircle the inner wall 15 and perform the function required, that is the cooling of the cylinder and offsetting the effects of the heat of compression. This chamber may be formed in a variety of ways. As one convenient construction I make the inner wall 15 in the form of a thin tubing which is driven into the cylinder to form the lining thereof, and the casting 4 is provided at each end at 19 and 20 with a chamber of a diameter that will fit the sleeve 15, but is chambered out between these portions to form the chamber 16. The tube 15 may be of brass or any other suitable metal. The upper end of the chamber 16 communicates with a port 21 which is controlled by an inlet valve 22, and this port 21 has communication with the inlet port 17 leading into the cylinder. The valve 22 is so arranged as to unseat when the piston descends so as to allow air to be drawn into the top of the cylinder above the piston. The casting 4 is shown as provided with a screw-threaded recess 23 situated above the port 21, and a plug 24 is screwed into the recess, said plug having a port 25 therein which forms communication between the ports 21 and 17.

In assembling the parts, the valve 22 is first dropped into place onto its valve seat 26 and then the plug 24 is screwed home, said plug acting to limit the opening movement of the valve, as will be obvious, and at the same time providing means for gaining access to the valve. This construction is shown clearly in Fig. 6. The outlet port for each cylinder is at the upper end thereof and is shown best in Fig. 7. The casting 4 is provided with the port 27 at the upper end of each cylinder which leads to a port 28 formed in a plug 29 which is screwed into a recess 30 formed in the top of the casting. The lower end of the plug is formed with a valve seat 31 with which a check-valve 32 coöperates. The lower end of the screw-threaded recess 30 communicates with a port 33 which leads to a lateral port 34 to which the discharge pipe 35 is secured. Each cylinder has a similar outlet valve and these outlet and inlet valves are so arranged, as shown in Fig. 6, that when either piston descends, the outlet valve will be closed while the inlet valve will be opened thereby drawing air into the cylinder, while when the piston rises the inlet valve will be closed and outlet valve opened to permit the air to be forced through the discharge pipe 35 into the tube. Since each inlet port communicates with the annular chamber 16 surrounding the cylinder lining, it will be obvious that all the air which is drawn into either cylinder must pass through the chamber 16 thereof and the current of cool air passing through said chamber 16 will keep the cylinder cool and offset the effects of the heat of compression.

While I have illustrated herein one embodiment of my invention, I do not wish to be limited to the constructional details shown.

Having fully described my invention, what I claim as new and desire to secure by Letters Patent is:—

In an air pump, the combination with a cylinder provided with a cylindrical bore, of a lining for said bore which is spaced from the walls thereof thereby to form an air chamber around said lining, a piston operating within said lining, a discharge pipe, said cylinder casting having an opening leading to said air chamber at its lower end on one side of the cylinder, an inlet port or passage leading from said air chamber at its upper end into the cylinder on the opposite side thereof, an outlet port or passage leading from the upper end of the cylinder to the discharge pipe, and valve plug apertures leading to said ports, valves loosely sustained in said ports or passages, and valve plugs removably mounted in the apertures and retaining the valves therein.

In testimony whereof, I have signed my name to this specification, in the presence of two subscribing witnesses.

CHARLES P. CLARKE.

Witnesses:
BERTHA F. HEUSER,
THOMAS J. DRUMMOND.